United States Patent
Miller et al.

(10) Patent No.: US 7,517,509 B2
(45) Date of Patent: Apr. 14, 2009

(54) PURIFICATION OF TRONA ORES BY CONDITIONING WITH AN OIL-IN-WATER EMULSION

(75) Inventors: J. D. Miller, Salt Lake City, UT (US); Xuming Wang, Salt Lake City, UT (US); Minhua Li, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 750 days.

(21) Appl. No.: 11/094,326

(22) Filed: Mar. 30, 2005

(65) Prior Publication Data

US 2005/0220687 A1 Oct. 6, 2005

Related U.S. Application Data

(60) Provisional application No. 60/558,532, filed on Mar. 31, 2004.

(51) Int. Cl.
*C01D 11/00* (2006.01)
(52) U.S. Cl. .................... 423/206.2; 23/302 T
(58) Field of Classification Search ............. 423/206.2, 423/421, 426; 23/302 T; 209/3, 10, 166
See application file for complete search history.

(56) References Cited

U.S. PATENT DOCUMENTS

| | | | |
|---|---|---|---|
| 2,346,140 A * | 4/1944 | Pike ........................... 423/189 |
| 3,248,182 A | 4/1966 | Herink et al. |
| 3,655,331 A | 4/1972 | Seglin et al. |
| 3,973,734 A | 8/1976 | Rosar et al. |
| 3,981,686 A | 9/1976 | Lobunez et al. |
| 4,202,667 A | 5/1980 | Conroy et al. |
| 4,283,277 A | 8/1981 | Brison et al. |
| 4,375,454 A | 3/1983 | Imperto et al. |
| 4,472,280 A | 9/1984 | Keeney |
| 4,528,090 A | 7/1985 | Tsui |
| 4,673,133 A | 6/1987 | Datta et al. |
| 4,968,413 A | 11/1990 | Datta et al. |
| 5,736,113 A * | 4/1998 | Hazen et al. ............. 423/206.2 |
| 5,911,959 A | 6/1999 | Wold et al. |
| 6,428,759 B1 | 8/2002 | Smith et al. |

OTHER PUBLICATIONS

Wang X., Li M., Miller J.D.; Flotation as a Process Alternative for the Treatment of Trona Resources, 2002 Society of Mechanical Engineering Annual Meeting held Feb. 25-27, Pheonix, Arizona, pp. 1-3.

* cited by examiner

*Primary Examiner*—Steven Bos
(74) *Attorney, Agent, or Firm*—Thorpe North & Western LLP

(57) ABSTRACT

The present invention is a trona concentrate and a process for floating gangue material from trona ore that comprises forming an emulsion, conditioning the trona ore at a high solids content in a saturated trona suspension, and then floating and removing the gangue material. The process for separating trona from gangue materials in trona ore can include emulsifying an oil in an aqueous solution to form an oil-in-water emulsion. A saturated trona suspension having a high solids content can also be formed having trona of a desired particle size. The undissolved trona in the saturated suspension can be conditioned by mixing the saturated suspension and the oil-in-water emulsion to form a conditioning solid suspension of trona and gangue material. A gas can be injected through the conditioning solid suspension to float the gangue material. Thus, the floated gangue material can be readily separated from the trona to form a purified trona concentrate without requirements of additional heat or other expensive processing steps.

17 Claims, 1 Drawing Sheet

PURIFICATION OF TRONA ORES BY CONDITIONING WITH AN OIL-IN-WATER EMULSION

RELATED APPLICATIONS

This application claims the benefit of U.S. Provisional Application 60/558,532, filed Mar. 31, 2004 which is hereby incorporated by reference in its entirety.

GOVERNMENT INTEREST

This invention was made with government support under grant number DE-FG-03-93ER14315 awarded by the Department of Energy. The Government has certain rights to the invention.

FIELD OF THE INVENTION

This invention relates to the processing of trona ores. More particularly, the present invention is drawn to separating trona from gangue materials in trona ore. Accordingly, the present invention involves the fields of chemistry, mineral processing engineering, metallurgical engineering, chemical engineering, and process design.

BACKGROUND OF THE INVENTION

About 90% of the soda ash ($Na_2CO_3$) production in the United States comes from the Trona deposits of Green River Basin in Wyoming. The trona ($Na_2CO_3 \cdot NaHCO_3 \cdot 2H_2O$) is in the form of an ore of trona mixed with gangue material, which gangue material includes insoluble minerals and other undesired materials. A typical treatment process includes treating the ore by a direct process involving dissolution at high temperature, removing of sediments, and filtration for the removal of impurities, followed by subsequent crystallization and calcination for the recovery of soda ash. This method is known as the sesquicarbonate process. Other processes are also known, such as the monohydrate process, for example. Using this process, the trona ore can be calcined directly, followed by dissolution, purification, and crystallization to produce soda ash. In each of these methods, the operating costs can be higher than desired because selective mining must be practiced to minimize unwanted gangue minerals in the feed, and the chemical plant must be operated at a high temperature, thus increasing energy consumption.

A preferred processing strategy would be to remove insoluble gangue mineral contaminants from the plant feed to achieve a relatively pure trona product (a trona concentrate), which could then be further processed as desired, or even further marketed as a new trona product. Additionally, pre-processing at ambient temperature and pressure would reduce costs substantially by allowing for the use of less selective high capacity mining techniques, such as long wall mining. Still further, preprocessing can offer the possibility of generating a new product (trona concentrate), make available additional trona resources which are currently of marginal value, and result in improved operation of the chemical plant by providing high quality feed, thereby resulting in the ability to more readily achieve refined product specifications. Such a preprocessing strategy has been limited by the lack of satisfactory process technology.

SUMMARY OF THE INVENTION

Thus, it has been recognized that separating gangue material from trona ores by flotation of the gangue material would be a desired separation technique for use at a commercial level. Accordingly, if such a flotation process could be achieved effectively, it would provide new opportunities to the industry.

In accordance with this recognition, a process for separating trona from gangue materials in trona ore can include emulsifying an oil in an aqueous solution to form an oil-in-water emulsion. A saturated trona brine can also be formed by dissolving trona to form a saturated solution. The saturated trona brine can be mixed with additional trona ore to form a saturated trona suspension, which can include useful trona and less desirable gangue particles. The trona can then be conditioned by mixing the saturated trona suspension and the oil-in-water emulsion to form a conditioning solid suspension of trona and gangue particles. Typically, a gas can be injected through the conditioning solid suspension to float the gangue particles.

In one detailed aspect of the present invention, an emulsifier having an amine functionality can be used. One particularly preferred emulsifier includes dodecylamine. In a similar manner, the oil phase can include a variety of water insoluble compounds. Non-limiting examples of currently preferred oil components can include kerosene, fuel oil, mineral oil, gasoline, and mixtures thereof.

Using this general process, the floated gangue material can be readily separated from the trona to leave a trona concentrate having an increased purity. The process of the present invention can yield a trona concentrate comprising up to and greater than 98 wt % or even 99 wt % $NaHCO_3 \cdot Na_2CO_3 \cdot 2H_2O$. In one embodiment, the concentrates can include less than 2 wt % or even less than 1 wt % gangue materials.

In yet another detailed aspect of the present invention, the conditioning solid suspension, including the emulsion, can have a high solids content. For example, trona ore can be added to the saturated trona brine in an amount sufficient to result in a solids content in the conditioning solid suspension which exceeds about 55 wt %. The amount of trona necessary to achieve a high solids content will depend largely on the quality of the original trona ore.

Further, the temperature can affect the solubility of trona in the solution. In one aspect, the present invention is designed to substantially reduce the need for heating throughout the process of forming sodium bicarbonate, as well as during the pre-processing steps set forth in accordance with embodiments of the present invention. Thus, it is typically preferred that the present invention be carried out without substantial heating of the saturated brine or emulsion. As a general matter, the process of the present invention, including individual steps, occurs at a temperature from a freezing temperature of the liquids to about 80° C. Most preferably, the operating temperature can range from about 10° C. to about 50° C. In one case, the operating temperature can be ambient temperature.

Additional features and advantages of the invention will be apparent from the following detailed description which illustrates, by way of example, features of the invention.

DETAILED DESCRIPTION OF THE PREFERRED EMBODIMENT(S)

Figure 1:
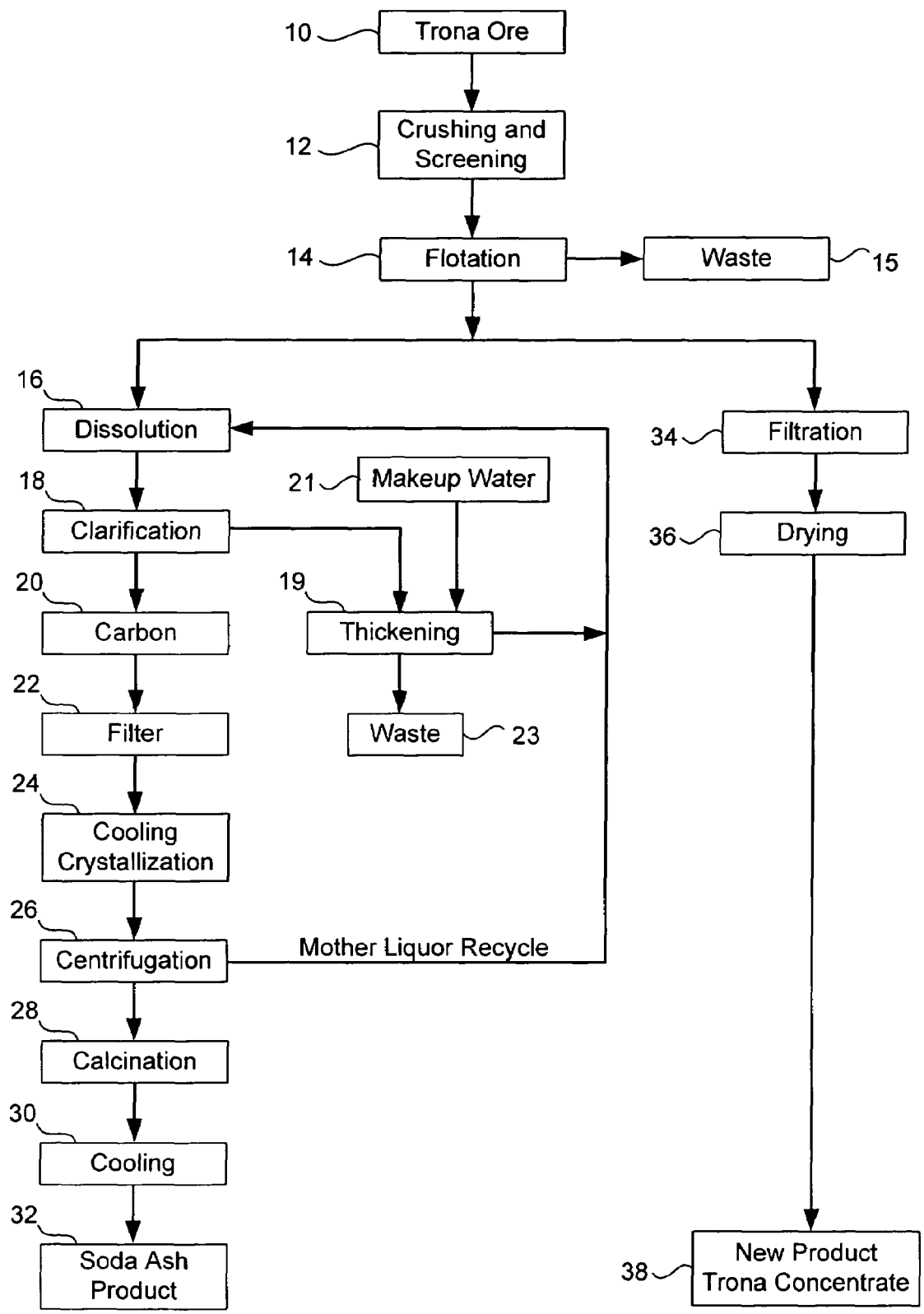
FIG. 1 is a flowchart illustrating an implementation of the present invention into a standard sesquicarbonate process, in accordance with an embodiment of the present invention.

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

As used in this specification and the appended claims, the singular forms "a," "an," and "the" include plural referents unless the content clearly dictates otherwise.

The term "saturated trona brine" refers to aqueous compositions that include dissolved trona. Although a saturated trona brine can include some suspended solids, the brine is typically less than about 5 wt %, and preferably less than about 2 wt %, solids. As trona is soluble, in order to condition and suspend a target trona, the brine is saturated with trona to prevent further dissolving of the target trona that is to be separated from the gangue material. Thus, trona ore can be added to the saturated trona brine to form a saturated trona suspension having a high solids content. The saturated trona suspension therefore has a trona ore concentration which substantially exceeds the solubility of the trona ore in the liquid. Typically, the liquid is water; however, this is not required as other polar liquids or additives can also be used. Further, the saturated trona suspension is most often a slurry having a high solids content, e.g., greater than about 60 wt %.

As used herein, "trona ore" refers generally to raw trona substantially as recovered from natural deposits, though more purified trona ore can also be used. As mentioned elsewhere, trona ore typically has a majority content of sodium sesquicarbonate ($NaHCO_3.Na_2CO_3.2H_2O$), with the remainder being undesirable gangue materials such as silica quartz, dolomite, oil shale, and various trace metals. Typically, raw trona ore comprises from about 80 to 95 wt % sodium sesquicarbonate. Most trona ore deposits in the United States are found in the Green River basin near Green River, Wyo.

The term "about" when referring to a numerical value or range is intended to encompass the values resulting from experimental error that can occur when taking measurements.

As used herein with respect to an identified property or circumstance, "substantially similar" or the like refers to a degree of deviation that is sufficiently small so as to not measurably detract from the identified property or circumstance. The exact degree of deviation allowable may in some cases depend on the specific context. Similarly, "substantial" when used in reference to a quantity or amount of a material, or a specific characteristic thereof, refers to an amount that is sufficient to provide an effect that the material or characteristic was intended to provide. Further, "substantially free" when used in reference to a quantity or amount of a material, or a specific characteristic thereof, refers to the absence of the material or characteristic, or to the presence of the material or characteristic in an amount that is insufficient to impart a measurable effect, normally imparted by such material or characteristic.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

In accordance with embodiments of the present invention, a process for separating trona from gangue materials of trona ore using an oil-in-water emulsion can be very effective. The process can include emulsifying an oil in an aqueous solution to form the oil-in-water emulsion. An amount of trona or trona ore can be dissolved in an aqueous solution to form a saturated trona brine. Additional trona ore can be added to the saturated trona brine to form a saturated trona suspension. The undissolved trona in the trona suspension can then be conditioned by mixing the saturated trona suspension and the oil-in-water emulsion to form a conditioning solid suspension of trona and gangue material. The gangue material and conditioned solid suspension of trona can then be separated to produce a trona concentrate.

The emulsion can be formed of an oil phase and an aqueous phase as described in more detail herein. For example, the emulsion can include an emulsifier. Such an emulsifier can have the dual purpose of promoting emulsification and promoting attraction between the gangue material and the oil phase of the oil-in-water emulsion. As stated, in one embodiment, oil can be emulsified into an aqueous solution with an emulsifier, such as a surfactant with an amine functionality, to form an oil-in-water (O/W) emulsion. For example, a dodecylamine composition can be used as the emulsifier, e.g., dodecylamine hydrochloride or dodecylamine acetate. Other emulsifiers can include, but are in no way limited to, alkylamine hydrochlorides or acetates such as dodecylamine hydrochloride, dodecylamine acetate, hexadecylamine hydrochloride, hexadecylamine acetate, fatty amines such as stearic amine and cetyl amine, triethanolamine lauryl sulfate, amine oxide surfactants such as $C_{10}$-$C_{18}$ alkyl dimethyl amine oxides, $C_8$-$C_{12}$ alkoxy ethyl dihydroxyethyl amine oxides, alkyl amido propyl amine oxide, dimethyloctyl amine oxide, diethyldecyl amine oxide, bis-(2-hydroxyethyl) dodecyl amine oxide, dimethyldodecyl amine oxide, dodecylamidopropyl dimethyl amine oxide and dimethyl-2-hydroxyoctadecyl amine oxide, and derivatives or mixtures of the above emulsifiers. Other suitable emulsifiers can include non-amine surfactants such as, but not limited to, hexadecyltrimethyl ammonium bromide, cetyltrimethyl ammonium bromide, cetylpyridinium bromide, dodecyl benzene sulfonates, polypropylene benzene sulfonates having 10 to 18 alkyl carbons, dibutyl naphthalene sulfonates, diisopropyl naphthalene sulfonates, alkyl compounds such as octyl sulfates, nonyl sulfates, decyl sulfonates, lauryl sulfates, coconut alcohol sulfates, tridecyl alcohol sulfates, tallow alcohol sulfates, cetyl sulfates, oleyl sulfates, N-alkyl taurates, polyoxyethylene nonylphenyl ether, magnesium laurate, zinc caprate, zinc myristate, sodium phenylstearate, aluminum dicaprylate, tetraisoamyl ammonium thiocyanate, tri-n-butyl-n-octadecylammonium formate, n-amyl tri-n-butylammonium iodide, sodium bis(2-ethylhexyl) succinate, sodium dinonylnaphthalene sulfonate, calcium cetylsulfate, dodecylamine oleate, dodecylamine propionate, cetyltrimethyl ammonium halide, stearyltrimethyl ammonium halide, dodecyltrimethyl ammonium halide, octadecyltrimethyl ammonium halide, didodecyldimethyl ammonium bromide, ditetradecyldimethyl ammonium bromide, ditetradecyldimethyl ammonium chloride, (2-octyloxy-1-octyl oxymethyl) polyoxyethylene ethyl ether, and mixtures thereof. The remainder of the aqueous phase can be water and/or other polar solvents, and any other optional additives known in the art. Although other compositions can be used, the emulsifier can generally comprise from about 0.1 wt % to about 10 wt % of the aqueous phase of the emulsion.

Typically, the oil phase can comprise a water insoluble non-polar compound. Though any functional oil can be used, typical oils for use can include kerosene, fuel oil, mineral oil, gasoline, diesel oil, and mixtures of these oils. Fuel oil is readily available and can be an effective oil for use in the present invention. In one aspect, the oil in the emulsion can be any liquid hydrocarbon oil, such as $C_6$ to $C_{24}$ aliphatic hydrocarbons, mineral oils, natural oils, or the like. The oil-in-water emulsion can be added as a collector composition to the solid suspension or the saturated trona brine to aid in conditioning the high solids content of the gangue material, thereby preparing the gangue material for subsequent flotation separation.

In an exemplary embodiment, the weight ratio of emulsifier, such as an amine-containing surfactant, to oil can be from about 1:2 to about 1:10 by weight, and preferably from about 1:4 to about 1:10. The amount of emulsion required to achieve acceptable conditioning of the trona is extremely low in comparison to the volume of saturated brine to be conditioned. As a general rule, the emulsion composition can be added to provide from about 0.5 to about 1.5 kilograms emulsifier per ton of suspended solids, and about 1 to about 10 kilograms oil per ton suspended undissolved solids.

In accordance with an embodiment of the present invention, a raw trona ore can be mixed with a liquid such as water. Preferably, a sufficient amount of raw trona ore is added to form a saturated brine of the trona ore. The saturated trona brine can then be mixed with additional trona ore to produce a saturated trona suspension wherein the trona ore is present in an amount which exceeds the solubility in the aqueous phase. Most preferably, the saturated brine has a high solids content. Thus, in accordance with one embodiment of the present invention, the trona ore can be present in a sufficiently high amount that the solids content of the saturated trona suspension is from about 50 wt % to about 85 wt % solids, and in one embodiment, from about 65 wt % to about 75 wt % solids. The trona ore can be provided at any size which is sufficient to allow conditioning and separation in accordance with the present invention. Although other size ranges can be functional, trona particle sizes in the suspension can range from about 0.05 mm to about 3 mm, and are typically from about 0.1 mm to about 1.5 mm, e.g., particles of about 0.1 mm by 1 mm. A small particle size will tend to provide increased surface area for separations, as well as allow the particles to stay in suspension for a time sufficient for conditioning.

As a general guideline in forming a saturated trona brine, the solubility of pure trona in water can range from about 10 wt % to about 30 wt %, depending on the temperature. At room temperature, the solubility of trona in water is about 20 wt %. In addition, it should be noted that merely dissolving trona in solution can liberate heat through an exothermic process. Trona typically has a positive heat of solution from about 30 BTU/lb trona to about 50 BTU/lb trona, e.g., about 49.5 BTU/lb at 25° C. in water to give a 0.3% solution and about 32 BTU/lb in a nearly saturated mother liquor. This is a similar property found in sodium carbonate systems. Typically, the solubility of sodium carbonate reaches a maximum of about 33.2 wt % in water at about 35.4° C. The solubility of sodium carbonate does not generally increase with increased temperatures above 35.4° C. On the contrary, solubility decreases at higher temperatures. In addition, dissolving of trona ore in water is most often a relatively highly exothermic process. For example, anhydrous sodium carbonate and sodium carbonate monohydrate have positive heats of solution. In contrast, sodium carbonate heptahydrate and decahydrate each have negative heats of solution.

As another guideline in performing the process of the present invention, the trona ore can be conditioned with the emulsion at 70 wt % to 75 wt % solids in the saturated trona suspension at ambient temperature. However, a solids content from about 50 wt % to about 85 wt % can be functional.

An alternative step of diluting the conditioning solid suspension can be carried out by adding supplemental saturated brine as an intermediate step. The supplemental saturated brine can be provided from a mother liquor or other feed from an associated sodium bicarbonate process. Alternatively, the supplemental saturated brine can be formed by adding raw trona ore in an amount such that the solids content is very low, e.g., less than about 10 wt % and preferably less than about 5 wt %, and most preferably less than about 1 wt %. The slurry suspension can then be diluted to about 10 wt % to about 20 wt % solids for separation of the gangue minerals (e.g. by flotation) from trona. Though these details are provided, the invention is not limited to these ranges, reagents, or conditions. For example, the solids content prior to dilution can be from about 60 wt % to about 80 wt %, and after dilution, from about 5 wt % to about 30 wt %.

Emulsification processes can affect the amount of emulsion reagent required to provide acceptable results in accordance with embodiments of the present invention. When an oil-in-water emulsion is prepared with a high speed mechanical emulsifier, the dosage can be reduced. For example, in one embodiment, with lower intensity mixing, the emulsion reagent dosage required might be about 0.94 kg dodecylamine per ton undissolved solids and 7.5 kg kerosene per ton undissolved solids. On the other hand, only 0.94 kg dodecylamine per ton and 2.8 kg kerosene per ton are needed when the emulsion is prepared using high speed mechanical emulsification. Without being bound by any particular theory, when using higher speed emulsification, such as by the use of a high speed or high shear mixer, a greater surface area of the discontinuous oil phase of the emulsion can be realized, which can reduce the required dosage.

The step of conditioning can be accomplished by simply mixing the saturated brine and the emulsion together. Although the optimal time and mixing conditions are best determined by standard practice of the present invention, typical conditioning times can range from about 1 minute to about 5 minutes at temperatures within about 40° C. of ambient. Of course, conditioning times can be adjusted by varying the mixing intensity and/or emulsion content of the suspension.

As mentioned previously, the process of the present invention can be beneficial in significantly reducing the need for additional costly heat to remove unwanted gangue material. Thus, in some embodiments, the formation of a trona concentrate can be accomplished without the addition of heat, e.g., carried out at substantially ambient conditions. In one detailed aspect, at least the step of conditioning can occur at a temperature from about 2° C. to about 60° C. Most often, the temperatures of each step can occur at a temperature from about 10° C. to about 50° C. However, it should be kept in mind that temperatures outside even the broader range can be useful, depending on available materials and their corresponding heat values.

Separation of the conditioned trona from the gangue material can be accomplished using any number of methods. Non-limiting examples of suitable processes can include flotation, settling, skimming, clarifying, centrifuging, decanting, combinations thereof, or the like. In one specific embodiment, a gas can be injected through the conditioned solid suspension of trona and gangue material in order to float the gangue material. Typically air is used as the flotation gas; however, other gases can also be used, e.g. nitrogen or the like.

Optionally, an additional flotation reagent can be added to enhance recovery of the gangue materials from the conditioned solid suspension. Additionally, many flotation processes can be used in connection with the present invention to separate gangue material from trona material. For example, a flocculating agent can be added to the suspension in order to accelerate and improve the recovery of gangue material from the suspension to leave the purified trona concentrate.

Once the gangue material has been removed, the material that substantially remains is the purified trona and residual emulsion components. The liquid residual components and/or water can be removed by conventional processes and the remaining trona concentrate can then be used as desired. The removed liquid can be recycled for use as either supplemental saturated brine or as make-up feed for any associated sodium bicarbonate production process, for example. Alternatively, the liquid residual components can be left in the purified trona concentrate so that the composition is in the form of a slurry which can be fed directly to an associated production process. Thus, the product of the present invention can be utilized as a feed stock which can be completely dissolved and then clarified and crystallized using known techniques. In yet another embodiment, the liquid or dry trona concentrate can be provided as a commercial product for use at a separate site.

Purified trona concentrate can be used for a wide variety of purposes such as, but not limited to, formation of sodium carbonate (soda ash), sodium bicarbonate (baking soda), sodium hydroxide, sodium sesquicarbonate feed, sodium phosphate, or the like. These products have a wide range of applications ranging from food products and medicines to glass production, paper production, detergents, chemical synthesis, and many other applications.

Regardless, the processes of the present invention can yield a trona concentrate comprising up to and greater than 98 wt % or even 99 wt % $NaHCO_3 \cdot Na_2CO_3 \cdot 2H_2O$. In one embodiment, the concentrates can include less than 2 wt % gangue materials, or even less than 1 wt % gangue materials.

When mined, trona ore is a dry material that is present with other dry gangue components that are undesirable. Without being bound to any particular theory, the conditioning step can provide a means of suspending and wetting the trona in a solution, without dissolving the trona. In other words, as trona is soluble in water, a saturated solution is used to prevent solubilization of the target trona to be separated from the gangue material. Introduction of the emulsion into the saturated brine and into contact with the trona and gangue material provides a precursor composition wherein the gangue material is susceptible to flotation. Thus, upon introduction of gas or air into the composition, air bubbles attach to the hydrophobic gangue particles, thereby causing separation by flotation of the hydrophobic gangue particles. As the gangue material is primarily silica quartz, dolomite, and oil shale, the emulsion, which can include an amine functionality via the emulsifier, is attracted to the gangue material. Thus, when the air becomes attracted to the oil, the gangue material can be floated with the rising air bubbles. The amount of air injected into the suspension is readily ascertainable by one skilled in the art after considering the present disclosure.

In one aspect of the present invention, the process steps in accordance with embodiments of the present invention can be integrated into known sodium carbonate production processes. For example, the method of the present invention can be incorporated into an existing sesquicarbonate process, as shown by the flowchart of FIG. 1. However, it will be understood that any known process for use or collection of trona materials can be used in connection the present invention, e.g., monohydrate process, sesquicarbonate process, or variations thereof. The flowchart of FIG. 1 depicts a modified sesquicarbonate process wherein raw trona ore 10 is initially treated by a crushing and screening step 12 to effect a size reduction. A flotation step 14 can be practiced according to embodiments of the present invention between the crushing and screening step and a standard dissolution step 16. Gangue and other undesirable materials can be separated and removed as a waste 15. In a currently practiced process of the prior art, material from the crushing and screening can often go through a typical flotation step and then directly to dissolution.

By performing the flotation step 10 in accordance with the principles of the present invention, the above-discussed efficiencies can be realized. For example, heating can be significantly reduced or eliminated and increased purity of the trona obtained. In this way, the slurry product of conditioned trona can be introduced into the dissolution step 16, followed by the standard, and known, steps of clarification 18, thickening 19, carbon treatment 20, filtration 22, crystallization 24, centrifugation 26, calcinations 28, cooling/drying 30, and collection/packaging of soda ash product 32. Makeup water 21 can be provided as needed throughout the process, e.g., in the thickening step 19, and waste 23 can be removed and treated or disposed of using conventional process, e.g., evaporation ponds, biodegradation, remediation, or the like. These steps are merely exemplary and can be modified or substituted using known processes or processes yet to be developed which are useful in the production of soda ash.

A further modification shown in FIG. 1 is the production of a new and marketable product, a trona concentrate, by subjecting the material from the flotation step 14 to the steps of filtration 34, and drying 36 of conditioned trona material from the flotation step 10. The resulting dried product is collected as a solid trona concentrate in collection step 38. Filtration and drying steps can be accomplished using any known methods such as those commonly used in production of soda ash, e.g., settling tanks, sieves, clarifiers, heated drums, etc. Those skilled in the art will readily envision economically appropriate systems for accomplishing these simple steps of filtration and drying. The dried trona concentrate can then be delivered to a customer in bulk and/or packaged for commercial sale.

EXAMPLES

The following examples illustrate the embodiments of the invention that are presently best known. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following examples provide further detail in connection with what are presently deemed to be the most practical and preferred embodiments of the invention.

Example 1

About 10 ml of a 1 wt % dodecylamine hydrochloride aqueous solution was mixed (low intensity mechanical mixing) with 1 ml kerosene (dodecylamine:kerosene was 1:8 by weight) to form an oil-in-water emulsion. A saturated trona brine was prepared, and then from 70 wt % to 75 wt % solids was added to the brine to form a solid trona ore suspension. The suspension was conditioned with the oil-in-water emulsion at emulsion contents of 0.94 kg dodecylamine per ton undissolved solids and 7.5 kg kerosene per ton undissolved solids for several minutes. Air bubbles were then injected and the gangue minerals floated. The trona concentrate had a purity of 99% and a recovery of more than 97% for a single stage bench scale flotation experiment.

Example 2

A 1:4 weight ratio of dodecylamine to fuel oil was used following the same procedure described in Example 1. The suspension was conditioned with the oil-in-water emulsion at emulsion contents of 0.94 kg dodecylamine per ton undissolved solids and 2.8 kg kerosene per ton undissolved solids (a 1:4 weight ratio of dodecylamine to fuel oil) for several minutes. This flotation process produced a 99% trona concentrate with 96% recovery.

Shown in Table 1 below are exemplary results for flotation of gangue material of trona feed having different particle sizes and different content of insoluble gangue material in the feed using the emulsion and feed compositions of Examples 1 and 2, respectively. The feed composition relates to the raw material before conditioning. The concentrate composition refers to the composition remaining after removing the gangue material. The tailing composition refers to the float material. Thus, a high concentration of trona in the concentrate composition is desirable, and low or residual amounts of trona in the trailing composition is also desirable.

TABLE 1

Effect of Particle Size and Grade

| Feed | Product | Grade, wt % Soluble | Trona Recovery wt % |
|---|---|---|---|
| Example 2 | Concentrate | 99.56 | 95.66 |
| Unsized, minus 1.18 mm | Tailing | 54.27 | 4.34 |
| 3.16% insol. | Feed | 96.84 | 100 |
| Example 1 | Concentrate | 99.06 | 96.94 |
| 1.18 mm × 0.3 mm | Tailing | 41.96 | 3.06 |
| 8.0% insol. | Feed | 92.00 | 100 |

As can be seen by Table 1, there is no significant effect on efficiency with respect to either particle size or the content of insoluble gangue material in the feed. A high degree of trona in the concentrate was obtainable regardless of the size and the gangue contained in the feed.

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention.

What is claimed is:

1. A process for separating trona from gangue materials in trona ore, comprising:
    a) emulsifying an oil in an aqueous solution to form an oil-in-water emulsion;
    b) forming a saturated trona brine;
    c) adding the trona ore to the saturated brine to form a saturated trona suspension, said trona ore including trona and gangue material;
    d) conditioning the trona by mixing the saturated trona suspension and the oil-in-water emulsion to form a conditioning solid suspension of trona and gangue material; and
    e) separating the gangue material from the trona to form a trona concentrate.

2. The process as in claim 1, further comprising a step of diluting the conditioning solid suspension by adding supplemental saturated brine.

3. The process as in claim 2, wherein after the diluting step, the conditioning solid suspension has a solids content from about 10 wt % to 20 wt %.

4. The process as in claim 1, wherein an emulsifier is used to form the oil-in-water emulsion.

5. The process as in claim 4, wherein the emulsifier comprises a compound with an amine functionality.

6. The process as in claim 5, wherein the emulsifier is an amine-containing surfactant.

7. The process as in claim 5, wherein the emulsifier comprises dodecylamine.

8. The process as in claim 4, wherein the emulsifier to oil ratio being from 1:10 to 1:2 by weight.

9. The process as in claim 1, wherein the conditioning solid suspension includes emulsifier present at from about 0.5 to about 1.5 kilograms per ton undissolved solids, and said oil being present at from about 1 to about 10 kilograms per ton undissolved solids.

10. The process as in claim 1, wherein the conditioning solid suspension has a solids content from about 65 wt % to 75 wt % solids content.

11. The process as in claim 1, wherein the oil is a water insoluble non-polar compound.

12. The process as in claim 11, wherein the oil is selected from the group consisting of kerosene, fuel oil, mineral oil, gasoline, and mixtures thereof 13. The process as in claim 1, further comprising injecting a gas though the conditioning solid suspension to float the gangue material.

14. The process as in claim 1, wherein the forming of the saturated trona brine includes mixing trona ore in an aqueous phase, wherein said trona ore has a solubility in the aqueous phase and the trona ore is present at an amount which exceeds the solubility in the aqueous phase.

15. The process as in claim 14, wherein the trona ore is present in a sufficiently high amount that a solids content of the saturated trona brine is from about 1 wt % to about 5 wt % solids.

16. The process as in claim 1, wherein at least the conditioning of the trona occurs at a temperature from about 2° C to about 60° C.

17. The process as in claim 1, wherein each step occurs at a temperature from about 10° C to about 50° C.

* * * * *